United States Patent [19]

Kronogård

[11] 3,973,396
[45] Aug. 10, 1976

[54] GAS TURBINE POWER PLANT

[75] Inventor: Sven-Olof Kronogård, Lomma, Sweden

[73] Assignee: United Turbine AB & Co., Kommanditbolag, Malmo, Sweden

[22] Filed: Oct. 16, 1974

[21] Appl. No.: 515,174

[52] U.S. Cl. .................... 60/39.66; 60/39.09 D; 60/39.51 R; 62/5; 415/116
[51] Int. Cl.² .................... F02C 7/08; F02C 7/18; F25B 9/02
[58] Field of Search ......... 60/39.66, 39.23, 39.09 D, 60/39.51 R; 62/5

[56] References Cited
UNITED STATES PATENTS

| | | | |
|---|---|---|---|
| 2,644,315 | 7/1953 | Jamieson | 62/5 |
| 2,786,341 | 3/1957 | Green | 62/5 |
| 2,839,898 | 6/1958 | Green | 62/5 |
| 2,839,900 | 6/1958 | Green | 62/5 |
| 2,839,901 | 6/1958 | Green | 62/5 |
| 2,940,257 | 6/1960 | Eckert et al. | 60/39.23 |
| 3,123,283 | 3/1964 | Leis | 60/39.09 D |
| 3,361,336 | 1/1968 | Foa | 62/5 |
| 3,535,873 | 10/1970 | Szydlowski | 60/39.66 |
| 3,584,458 | 6/1971 | Wetzler | 60/39.66 |

Primary Examiner—Carlton R. Croyle
Assistant Examiner—Robert E. Garrett
Attorney, Agent, or Firm—Holman & Stern

[57] ABSTRACT

The cooling of a gas turbine is a critical problem and will consume a considerable quantity of compressed air at the temperature ordinarily available. To improve the cooling properties, a portion of the air delivered by the compressor is divided off and is conveyed to an expansion member, where it is further divided into a hot and a cold fraction. This cold fraction, which can have a temperature well below the freezing point, is used, preferably mixed with air delivered directly from the compressor, for cooling the turbine inlet means.

4 Claims, 7 Drawing Figures

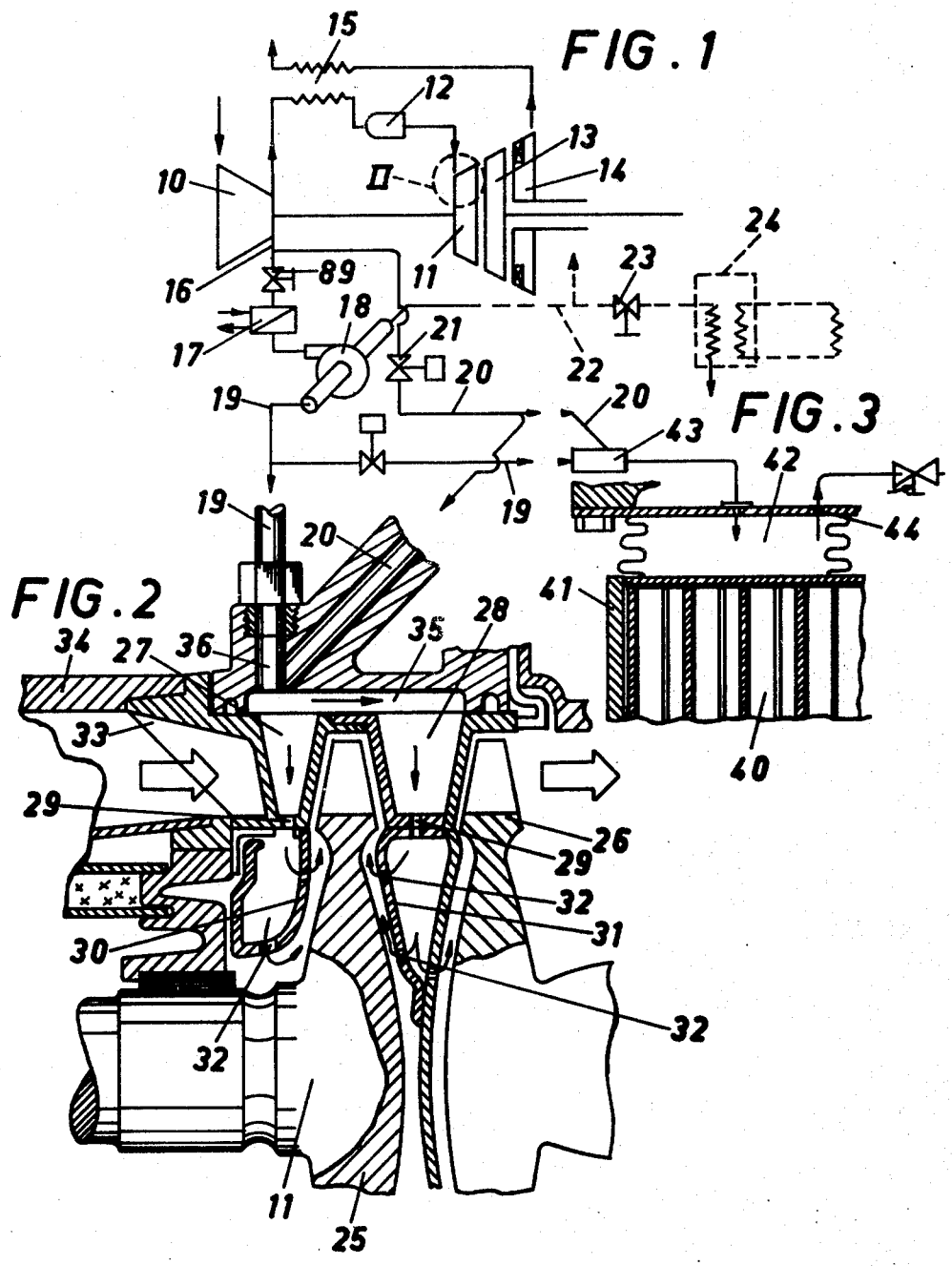

3,973,396

GAS TURBINE POWER PLANT

BACKGROUND OF THE INVENTION

A desirable manner of increasing the efficiency and the specific power output of a gas turbine power plant of turbo-dynamic type is to increase the temperature of the operating cycle. This will, however, impose heavy demands upon the strength of the high temperature components, especially upon the first turbine stage, which at temperatures of about 1000°C and thereabove preferably should be provided with efficient air cooling, depending upon the requirements for long working life, operational conditions and selection of materials.

The supply of the air necessary for cooling will, at the actual high operating temperatures, be a severe problem, either calling for an extensive, separate cooling system, or consuming too large a portion of the comparatively warm air from the compressor, which is valuable for the gas generation.

SUMMARY OF THE INVENTION

A rational utilization of the cooling air and a compact plant will, according to the invention, be obtained if the plant includes means for dividing off a portion of the air delivered by the compressor and conveying said divided-off portion to an expansion member arranged to further divide said portion into a hot fraction and a cold fraction, as well as further means for conveying at least part of said cold fraction to the inlet of the turbine, i.e. first to the inlet means of the first inlet stage, or stages and possibly also to the rotors therein and furthermore to the sealing means at a heat exchanger, if it is of a rotating type. In such a manner, the strength as well as the shape and the useful life time of these components will be increased.

The hot fraction may be conveyed to the gas side of the plant and/or for utilization in some auxiliary apparatus, directly or indirectly cooperating with the plant.

The expansion member is preferably a so called Hilsch-tube, into which the air from the compressor, possibly after intermediate cooling, is admitted tangentially and is divided into two fractions led to outlets directed axially away from each other. The inner fraction will, during its rotating movement, transfer energy to the outer fraction, and will thus be cooled down due to the work produced, while simultaneously the outer fraction will be correspondingly heated, due to the work received.

BRIEF DESCRIPTION OF THE DRAWINGS

FIG. 1 schematically shows a gas turbine plant including two turbines provided with air cooling at some parts, as well as an expansion member being a Hilsch-tube, FIG. 2 on a larger scale shows a portion of the inlet to the first turbine stage, FIG. 3, on a larger scale, shows a portion of the sealing means at a rotating heat exchanger.

DESCRIPTION OF SOME PREFERRED EMBODIMENTS

Figure 7:
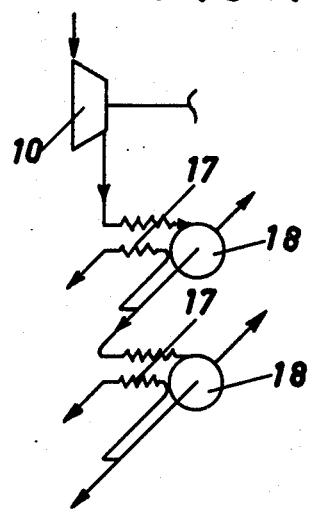
FIG. 7 shows a series connection of two Hilsch-tubes.

The gas turbine power plant shown in FIG. 1 includes a compressor 10, a turbine 11, driving the same, as well as a combustion chamber 12, located between the compressor and the turbine.

The plant further includes a turbine with two rotors 13 and 14, the shafts of which, in a manner not specifically illustrated, is connected to external power consumers.

The plant illustrated is considered to be used with a big vehicle and the plant includes, beside a system for cooling the turbines, also an air conditioning arrangement for the operator's cabin as well as a cooling plant or an air conditioning plant for goods, which will be described later on, as well as different auxiliaries not shown, which are driven directly or indirectly by the plant. The shafts of the power turbines as well as of the compressor turbine may be interconnected by some transmission means (not shown) in such a manner that power may be transferred from one turbine rotor to the other as operating conditions so require, in order to distribute the load in the best manner, thermally as well as mechanically. Such arrangements will make possible a low peripheral speed and thus low stresses at the first, hotest turbine rotor. This may therefore be arranged for a simplified external air cooling, while the fixed guide vane apparatus will require, and also easily may be provided with, an efficient internal cooling of the type proposed here.

The gases from the power turbine is conveyed through a heat exchaner 15, in which the air issuing from compressor 10 is preheated before it reaches the combustion chamber 12.

A portion of the air delivered by compressor 10 is bled off for cooling the inlet part of compressor turbine 11, and is by a conduit 16 conveyed through a cooler 17 to an expansion member 18, here being a so called Hilsch-tube. The volume of this divided-off air is governed by means of a first valve 89.

Figure 5:
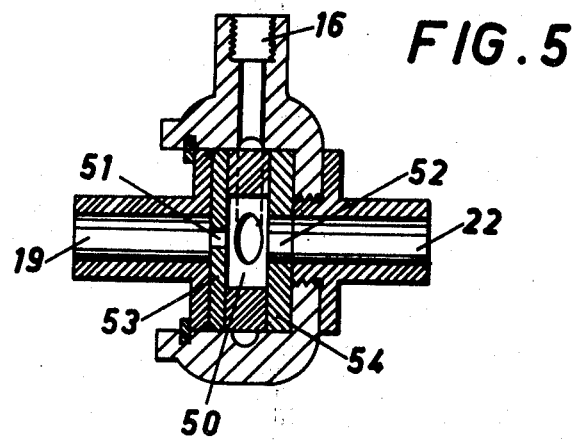

A Hilsch-tube consists basically, as is shown in FIG. 5, of a cylindrical expansion chamber 50, into which air from the compressor is introduced tangentially through a conduit, in FIG. 1 denoted by 16, in such a manner that a forceful rotating movement is induced. Each of the two opposite side walls of this chamber is provided with a centrally located exit, of which one, 51, has noticeably smaller diameter than the other, 52. The openings may possibly, as is shown in the figure, be located in replaceable washers 53 and 54, respectively.

The air within the chamber divided into two fractions, of which the inner one, which leaves the chamber through the narrower opening 51, has transferred a major portion of its energy content to the outer fraction, and in doing so has been considerably cooled down.

The air leaving the compressor may have a temperature of about 300°C, and if cooler 17 has sufficient capacity to lower the temperature of the divided-off volume of air to about the ambient temperature it is possible to obtain a temperature of about −50°C of the cooled air fraction. For marine use, sea water may be utilized for cooling the incoming air, and it will then be possible to obtain correspondingly lower cooling air temperature, if so required. It is thus possible to obtain a cooling air, which has a temperature of about 350°C below that of the air leaving the compressor. With a gas temperature at the first guide vanes of about 1000°C the temperature difference will be increased from 700°C to 1050°C, that is about 50% with a corresponding increase of the cooling capacity.

This cool air fraction is, by way of a conduit 19, lead to the inlet of the compressor turbine, and as the air can be of very low temperature it is advantageously mixed with air, which by a conduit 20 is transferred directly from the compressor. The two streams of air are mixed in an ejector, preferably in the manner to be described below in connection with FIG. 2, where the stream of air coming from the compressor will suck along the cool, expanded stream of air.

The temperature of the mixture is governed by means of a second valve 21, preferably located in the warm conduit 20. If the valve is located in conduit 19 it is necessary to prevent clogging by ice during start and operation with air having a high moisture content.

The hot fraction issuing from expansion member 18 is conveyed to the gas side of the plant by way of a conduit 22. It is preferably sucked away by an ejector, and is lead to some low pressure compartment, where it can be used as for cooling components with a limited cooling requirement. A portion of the hot fraction may be used for de-icing of windscreens, for maintaining the temperature in hot stores, for heating hot water systems or water heating systems, or for heating of the fuel oil or the like where such requirements are at hand.

A portion of the hot fraction may, by way of a valve 23, be transferred to an auxiliary, here denoted by 24. This auxiliary may form part of an air conditioning, or cooling plant, which is provided at the vehicle propelled by the gas turbine plant, either for making the temperature in the operator's cabin more comfortable, or for cooling the cargo of the vehicle. If the hot gas fraction is used directly for heating purposes by mixing with fresh air this mixing is preferably brought about in a separate sound-insulated mixing chamber provided with a suitable thermostate, and valving arrangement, which on such an occasion may be simple and cheap.

FIG. 2 shows on a larger scale the portion encircled by a dashed line in FIG. 1 and denoted by II.

The rotor of the compressor turbine is denoted by 25 and the rotor of the power turbine is denoted by 26. Upstream of each of these rotors there are fixed guide vanes 27 and 28, respectively. These components are preferably manufactured from ceramic material, or from metallic material with ceramic inserts in the hollow vanes for obtaining an efficient surface cooling, whereby they will be adapted to withstand the high temperatures. The radially inward ends of the guide vanes 27 and 28 are provided with openings 29 through which air will flow out in the direction of the turbine rotor 24, about at the roots of the buckets thereof.

When the rotors are made of heat resistant steel, the portion where the buckets are fitted (the roots) may be cooled by way of guide plates 30, 31 fitted adjacent to the openings 29 and provided with suitably located openings 32. Hereby a lower counterpressure for the cooling air is obtained, as the pressure is lower closer to the axis of the rotor.

The guide vanes 27 and 28 are hollow and built together to form an annular element 33, which is fitted into a housing 34 of the turbine in such a manner that an air distribution chamber 35 is formed, in communication with all guide vanes. The conduit 19 for the cooled air fraction from the expansion member 17 and a conduit 20 directly from the compressor are connected to this chamber 35, in such a manner that an ejector action is obtained at 36. By means of the guide plates 30, 31 a lower counterpressure is obtained as previously mentioned, and hereby a better reduction of pressure and temperature, and consequently a better cooling is obtained.

FIG. 3 shows how cooling air from expansion member 18 may be used at a further critical portion of the plant, i.e. at the sealing means of the heat exchanger 15.

When this is of the rotatable type it will include a cylindrical body 40 (of which only a portion is shown in FIG. 3). This cylindrical body is enclosed in a casing 41. Between the hot portion of the body, through which the gas will pass, and the portion thereof through which air will pass, there is a sealing means 42, being shaped as a bellows. This may be cooled by means of air bled-off from conduits 19 and 20 and mixed in an ejector 43. The pressure of the cooling air will maintain the lower plate of the bellows pressed against the rotating body 40. The air leaves the bellows through openings 44 communicating with a conduit and having a predetermined size, so a desired pressure will be maintained within the bellows. Alternatively the pressure in the bellows, and of the cooling air, may be governed by a throttling of the admission conduit and fixed-size outlet opening in the bellows, without any outlet conduit.

Instead of a Hilsch-tube any other known type of expansion member and suitably mixing and by-pass means with corresponding functions may be used, and it is evident that the number of steps in the compressor and in the turbines may vary depending upon the type and size of the power plant. More than one expansion member may thus be included, and the cool air from any of these may be utilized for other cooling purposes than at the turbine. For extreme cooling requirements, the cooling air from the compressor may be further compressed in a smaller compressor and be cooled before a repeated, stepwise expansion in Hilsch-tube systems connected in series in the manner shown in FIG. 6. Here a portion of the cool fraction from each step is used for cooling in a heat exchanger 17 at the inlet to the pertaining step.

Figure 4:
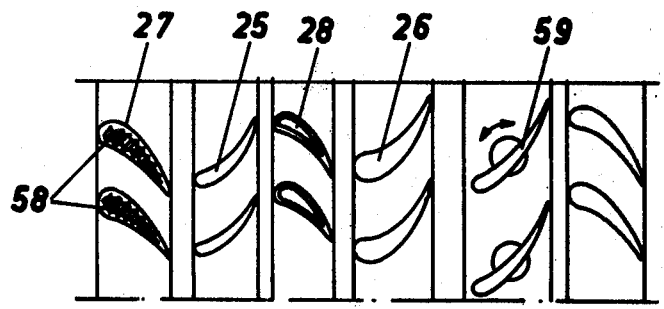
FIG. 4 shows a portion of the guide vane and bucket system of the turbines, FIG. 5 schematically shows a Hilsch-tube.

FIG. 4 shows a longitudinal section through a portion of the guide vane and bucket system of the turbine according to FIG. 1. The guide vanes 27 at the inlet of the first turbine step 25 are manufactured from ceramic or metallic material, and are hollow to facilitate air cooling. In the voids of metallic guide vanes, a number of filler bodies 58 of ceramic material will be fitted. These will limit the efficient passage area, and thus increase the velocity and the cooling capacity of the air, which is forced intimately to follow the internal walls of the void.

The guide vanes 28 of the second step are also hollow, but have on this occasion not the same thickness as the first guide vanes, and will furthermore operate at a somewhat lower temperature. No filler bodies will therefore be required.

The inlet guide vanes 59 to the third turbine step are preferably adjustable. Here the gas has so low a temperature, that no cooling is necessary. The material in these vanes may be metallic or ceramic.

Figure 6:
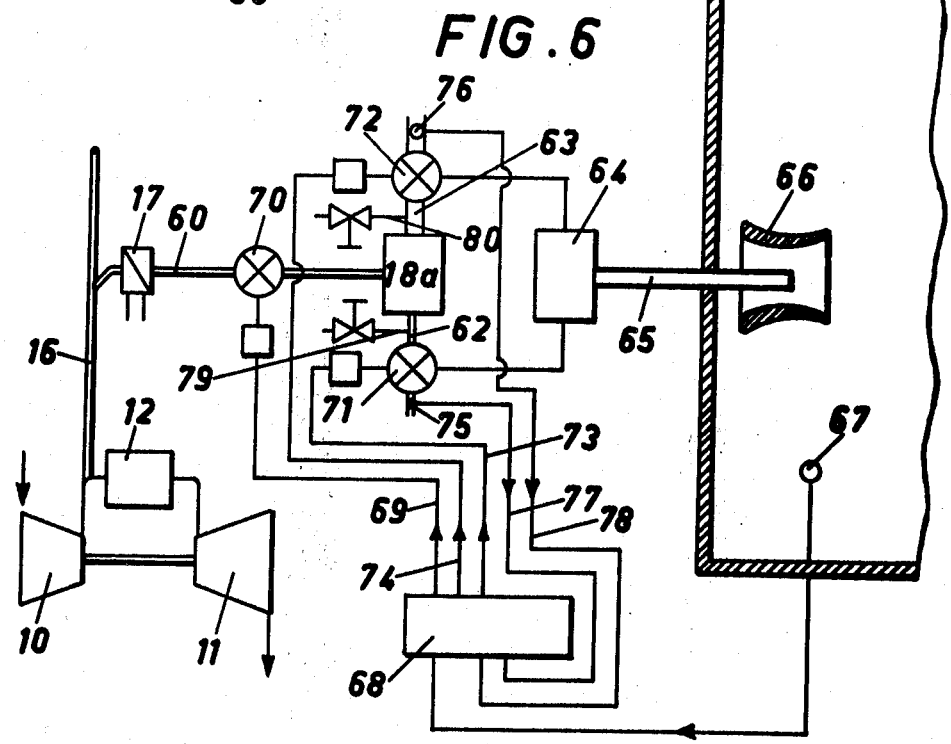
FIG. 6 shows how a portion of the compressed air, by way of a Hilsh-tube is utilized for air conditioning of an attached auxiliary.

An auxiliary utilizing the cool and the hot fractions leaving an expansion member is shown in FIG. 6.

Of the gas turbine plant, only the compressor 10, the turbine 11 driving the same as well as the combustion chamber 12 are shown. From the conduit 16 leaving to the cooling arrangement at the turbine, above described, a further conduit 60 is branched off for the conveying a portion of the air to a second Hilsch-tube 18a.

This is here primarily adopted for air conditioning of an insulated cargo space 61 of the vehicle. Depending upon the type of the cargo this space will have to be cooled, or maintained at a certain temperature.

The cooled fraction is conveyed away from the Hilsch-tube by a conduit 62, and the hot fraction by another conduit 63. These conduits are connected to a mixing chamber 64, and the mixture is conveyed into the cargo space 61 by conduit 65, which is connected to an ejector, or other suitable apparatus 66 for maintaining the air within the cargo space in circulation.

Within the cargo space 61 there is a sensor 67, which reacts to the temperature and transfers signals depending upon changes of temperature to a control member 68. By impulses conveyed through a conduit 69 this member governs a valve 70 in conduit 60 and determines the volume of air to the Hilsch-tube 17a. In each of the air fraction conduits 62 and 63 there is a further valve 71 and 72, respectively. These are governed from apparatus 68 by means of impulses through conduits 73 and 74. The valves 71 and 72 determine the mixing temperature with chamber 64 depending upon the volume of air determined by valve 70.

The portion of the air fractions which are not conveyed to chamber 64 may be utilized for other purposes, or are just exhausted. In each of the outlets from valves 71 and 72 there is a sensor 75 and 76, respectively. Signals from these are transferred to the control member 68 by way of conduits 77 and 78, so the member will react and alter the position of valve 70, if the discharge from any of valves 71, 72 should be too high.

By way of branch conduits 79 and 80, respectively, which are connected to conduits 62 and 63 upstream of valves 71 and 72, the operator may bleed off air for cooling or for heating food and drink, for instance in a cooling or a heating cupboard.

When an especially cool (or hot) fraction is needed, a precooling (preheating) may be obtained by means of a portion of the cooled (hot) fraction, as is illustrated in FIG. 7. Basically it is possible, if air of sufficient high pressure is available, to use this method for condensing certain gases to liquid, which may be of special interest for certain stationary or large mobile appliances.

The invention above described is not limited to the embodiments shown, but may be varied in many ways within the scope of the appended claims.

What I claim is:

1. A gas turbine power plant comprising at least one compressor, at least one combustion chamber and at least one turbine and further including means for dividing off a portion of the compressed air delivered by the compressor for cooling the turbine, the improvement of an expansion member including means arranged to divide a supply fluid into a hot fraction and a cold fraction, means for conveying said divided-off portion of compressed air to said expansion member, further means for conveying at least part of said cold fraction to the inlet means of the said at least one turbine, means for conveying a further portion of the air delivered by the compressor directly to the inlet means of the turbine; and means for mixing this further portion of air with the cold fraction conveyed to the turbine inlet means.

2. The gas turbine power plant according to claim 1, in which the means for mixing the directly supplied compressed air and the cold fraction includes an ejector.

3. The gas turbine power plant according to claim 1, said plant including a gas side; and means for conveying the hot fraction from the expansion member to the gas side of the plant.

4. The gas turbine power plant according to claim 1, in which the means for mixing said further portion of air with said cold fraction of air includes a mixing chamber, governing valves in the means conveying air to said mixing chamber and a sensor at the turbine inlet for monitoring said governing valves.

* * * * *